United States Patent [19]

Therond

[11] Patent Number: 5,002,411
[45] Date of Patent: Mar. 26, 1991

[54] APPARATUS FOR MARKING OBJECTS BY A VIBRATING TOOL

[75] Inventor: Marcel Therond, Rillieux, France

[73] Assignee: Technifor, Villeurbanne, France

[21] Appl. No.: 440,256

[22] Filed: Nov. 22, 1989

[30] Foreign Application Priority Data

Dec. 1, 1988 [FR] France .................. 88 16102

[51] Int. Cl.$^5$ .................. B41J 3/38
[52] U.S. Cl. .................. 400/118; 400/127
[58] Field of Search .................. 101/4, 3.1, 18; 400/118, 127, 128, 130, 131

[56] References Cited

U.S. PATENT DOCUMENTS 3,054,494  9/1962  Rizzetti .................. 101/4 X
4,089,262  5/1978  Sopora .................. 101/4

FOREIGN PATENT DOCUMENTS 2460134  7/1975  Fed. Rep. of Germany .......... 101/4

*Primary Examiner*—Clifford D. Crowder
*Attorney, Agent, or Firm*—Dowell & Dowell

[57] ABSTRACT

A device for marking objects by micro-percussion pneumatic tools including a vibrating tip wherein the tools are mounted on a carriage which is slidably mounted with respect to two support shafts and which is moved along an axis of translation by a first drive member and wherein the carriage is pivotally mounted to swing the tip of the tool in a direction perpendicular to the direction of translation by a second drive member.

7 Claims, 2 Drawing Sheets

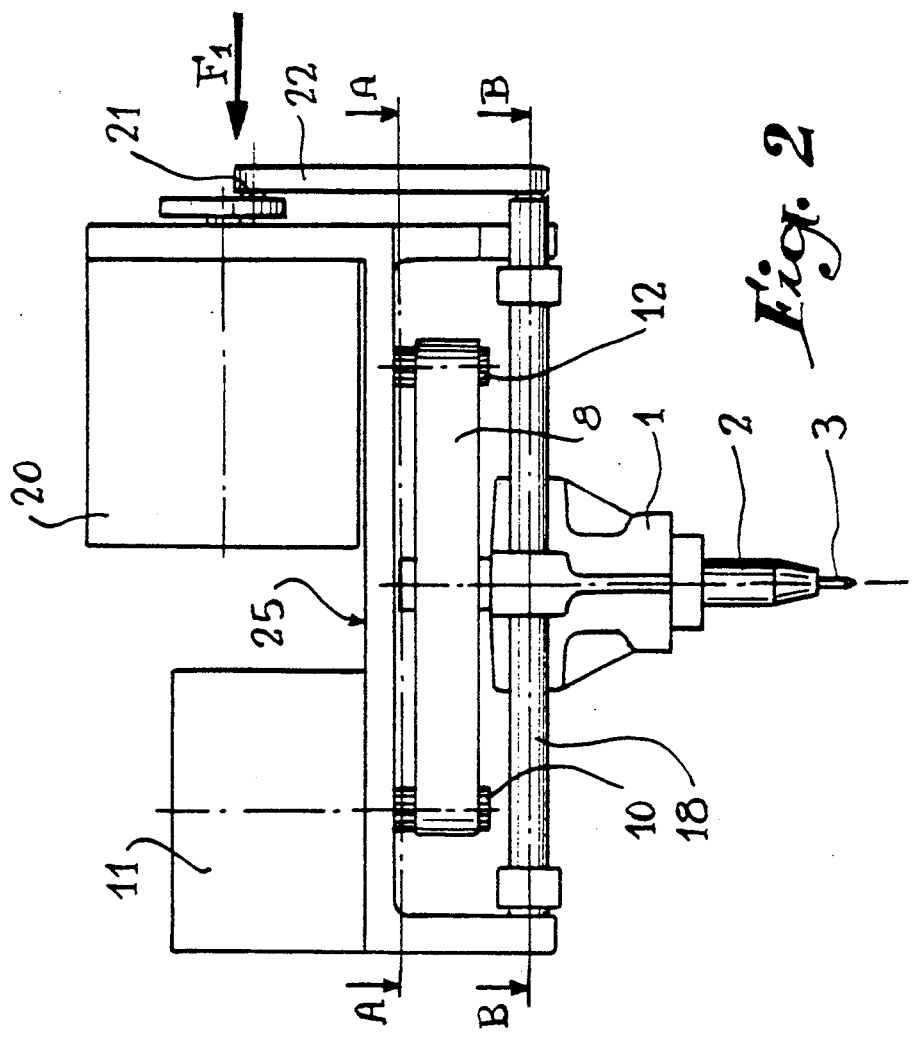
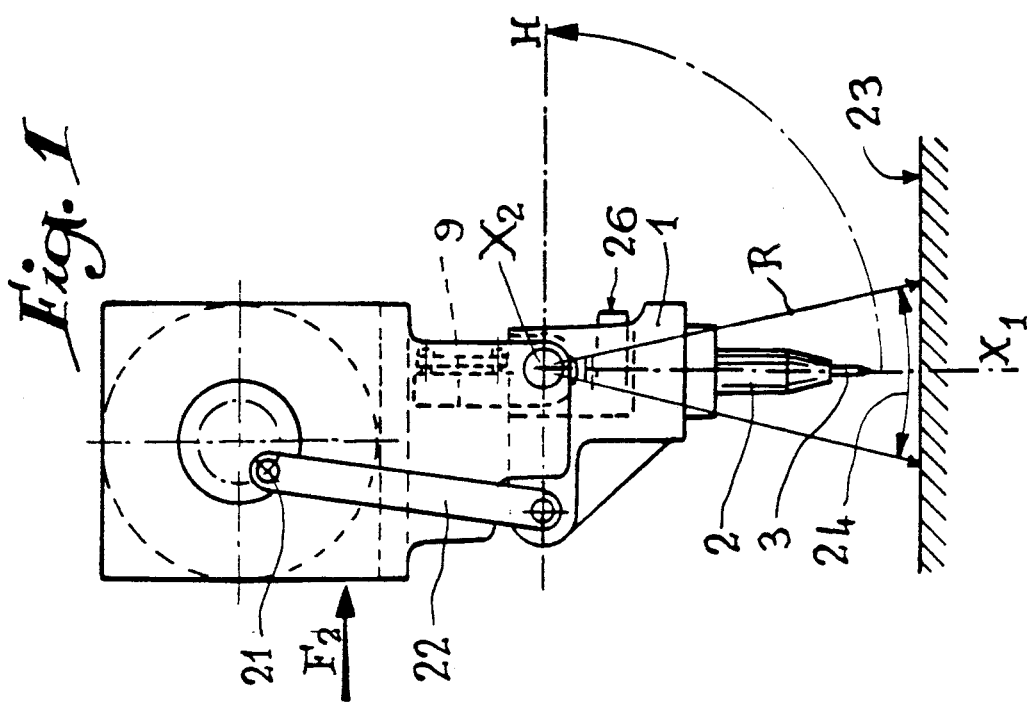

APPARATUS FOR MARKING OBJECTS BY A VIBRATING TOOL

BACKGROUND OF THE INVENTION

1. Field of the Invention

The invention relates to a device for marking objects by the vibrating tip of a pneumatic tool.

2. History of the Related Art

Marking devices in which the tip of a pneumatic tool is actuated by a compressed gas such as air, are known. Such devices move cyclically along their axis in the direction of the surface of the object to be marked. After some degree of movement the devices strike the object and then return to their initial position. Each impact causes aslight plastic deformation of the surface of an object. Known guiding means make it possible to displace the tip of marking devices in the vicinity of the surface of the object to be marked without interrupting the cyclic functioning of the tip at relatively high frequency. The vibrating tips may thus trace by micro-percussion, by their displacement along two perpendicular axes parallel to the plane of the surface of an object, identification markings such as letters, figures or other patterns.

Devices for guiding a pneumatic tool to effect such a marking by micro-percussion are also known. They comprise two carriages which move in perpendicular directions, each driven by a motor controlled by conventional electronics. Often, one of the two motors is mounted on one of the two carriages, which complicates its electrical supply. The two carriages must be guided individually with high precision in order to obtain sufficiently precise lines of the identification markings.

The possibility has been considered of making a device for marking by micro-percussion which does not comprise a double-carriage structure which allows the guiding of a pneumatic tool with vibrating tip with high precision so as to trace on the plane of marking of an object, two-dimensional identification markings. It is also desired to avoid mounting a drive motor on a movable carriage in order to simplify and lighten the carriage which drives the pneumatic tool.

The device forming the subject matter of the invention brings a particularly efficient solution to the problem raised.

SUMMARY OF THE INVENTION

The invention is directed to a device for marking by micro-percussion which comprises a pneumatic tool provided with a vibrating tip adapted to trace, on the plane of marking of an object, by plastic deformation, two-dimensional identification markings. A first drive member makes it possible, via a first transmission, to displace the pneumatic tool by appropriate guides along an axis of translation parallel to the plane of marking. A second drive member normally connected to a second transmission, makes it possible to rotate the tool about an axis, in a plane perpendicular to the axis of translation in order to displace the points of impact of the vibrating tip on the plane of marking in a direction perpendicular to the direction of translation. In a work position, the radius R of the circle tangential to the plane of marking of the object, having for its center the axis of rotation of the tool, is greater than 1.5 times the extent of the zone of marking on the plane of the object in a direction perpendicular to the axis of translation. Under these conditions, the angular opening of the arc of a circle which may be covered by the vibrating tip of the pneumatic tool in the zone of a marking does not exceed 40°.

The angular opening of the arc of circle which may be covered by the vibrating tip to attain the whole extent of the zone of marking is preferably less than 30° and the radius R is greater than twice the extent of the marking zone.

The means for guiding the pneumatic tool along the axis of translation is preferably a shaft on which a carriage which supports the pneumatic tool is slidably mounted.

Also, the first transmission means is preferably a synchronous belt or chain, disposed parallel to the axis of translation, driven by a pinion connected to the first drive, member and connected at a point, directly or indirectly, to the pneumatic tool.

The axis of rotation of the pneumatic tool should also merge with the axis of the shaft on which the carriage is slidably mounted.

The second transmission includes a rod connected to the second drive member by a crank which, by an appropriate linkage, drives the pneumatic tool about its axis of rotation so as to displace the vibrating tip inside the arc of a circle corresponding to the extent of the marking zone. In another embodiment, a transmission system of the belt and pulley type may be employed, which performs the same functions as the connecting rod/crank assembly, while allowing a greater angular stroke to facilitate replacement of the marking stylus.

Preferably, the synchronous belt or chain is connected to the pneumatic tool via a piece comprising a bore of revolution, mounted to rotate freely on a shaft which guides the tool in translation, the two lateral faces of this piece being separated by a small clearance of the lateral walls secured to the pneumatic tool; connection between the bored piece and the synchronous belt or the chain is ensured by a connecting rod. The lateral walls fast with the pneumatic tool against which the bored piece abuts are advantageously the lateral walls of a cut made in the tool-holder carriage for housing this bored piece between two bearing surfaces of this carriage on the guide shaft.

BRIEF DESCRIPTION OF THE DRAWINGS

The accompanying drawing describes, in non-limiting manner, a particular embodiment of the present invention.

FIG. 1 is a view in elevation of the invention taken in the direction of arrow F1 of FIG. 2.

FIG. 2 is a view in elevation of the invention of FIG. 1 taken in the direction of arrow F2 of FIG. 1.

DESCRIPTION OF THE PREFERRED EMBODIMENT

Figure 3:
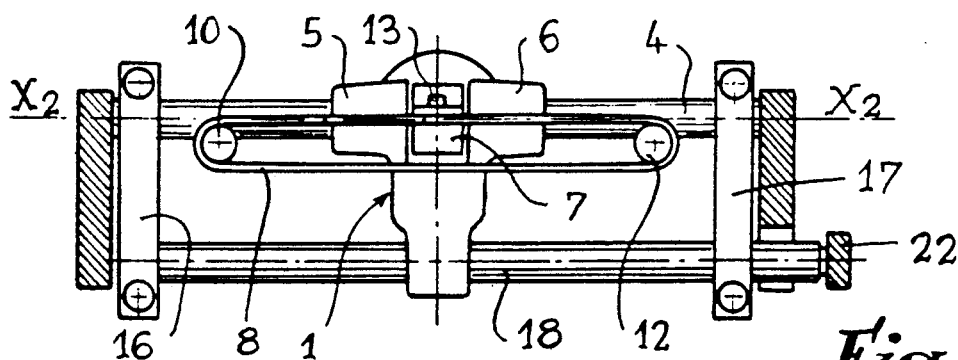
FIG. 3 is a section taken along plane A—A of FIG. 2.
Figure 4:
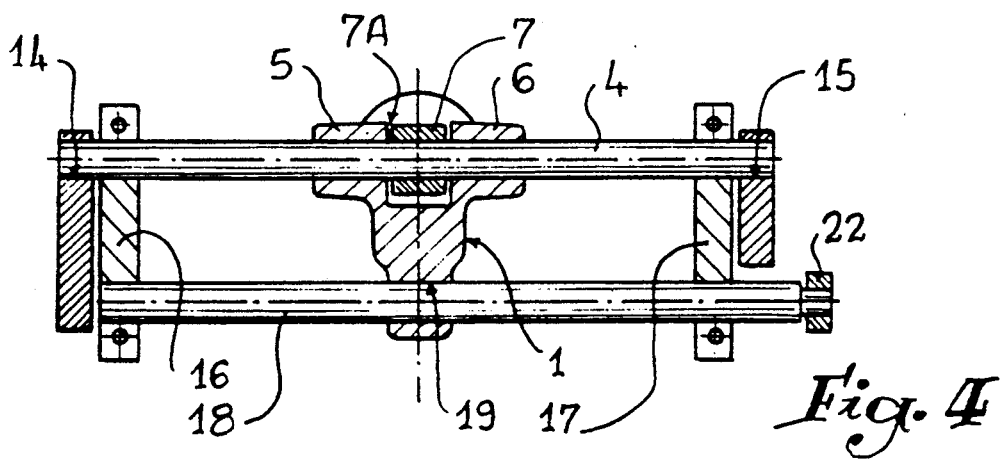
FIG. 4 is a section taken along plane B—B of FIG. 2.

The device shown in FIGS. 1 to 4 comprises a carriage 1 to which is fixed a pneumatic tool 2 provided with a vibrating tip 3 adapted to move along its axis x1 in a cyclic reciprocating movement under the action of a compressed gas such as air. The carriage 1 is mounted to slide on a shaft 4 which guides the carriage along the axis of translation x2—x2. The carriage includes two bearing surfaces 5, 6 between which a cylindrical piece 7 is mounted to rotate freely on the shaft 4. The lateral annular faces of the piece 7 are separated by a small clearance 7A from the corresponding lateral faces of the bearing surfaces 5, 6; the small clearance such as 7A allows free rotation of the bearing surfaces with respect to the cylindrical piece 7 which is connected to a synchronous belt 8 by a connecting rod 9. The synchronous belt 8 which functions as a first transmission is stretched parallel to axis x2—x2 between the pinion 10 of a first drive motor 11 and a guide pulley 12. The connecting rod 9 is fastened to the belt 8 by a clamping tab 13. The shaft 4, free to rotate in bearing surfaces 14, 15, at its two ends, is connected by two parallel small rods 16, 17 which are blocked from rotation with respect to shaft 4 and also with respect to a secondary shaft 18 parallel to the shaft 4. Carriage 1 abuts the secondary shaft via a sliding bearing surface 19.

The second drive motor, via a second transmission, provokes rotation of carriage 1 about x2—x2. As shown in the Figures, this second transmission comprises a crank 21, driven by the second drive motor 20, which drives a connecting rod 22 connected to the secondary shaft 18 that it rotates about shaft 4, causing rotation of carriage 1. It will be noted that, whatever the position of the carriage 1 along the shaft 4, the same displacement of the connecting rod 22 brings about rotation of the carriage 1 through the same angle and therefore the same angular displacement of the vibrating tip 3.

As shown in FIG. 1, the extent of the marking zone of the vibrating tip 3 on the plane of marking 23 of an object corresponds to an arc 24 of about 20°. It will be noted that the radius R of the circle of axis x2—x2 tangential to the plane of marking of an object with the vibrating tip 3 being in working position with respect to plane 23, is equal to about 3 times the extent of this marking zone corresponding to the arc of 20°. It will be observed that, under these conditions, the stroke of the vibrating tip is increased only by a length of 1.5% of radius R at the two ends of the arc, spaced apart only by 10° with respect to the vertical axis x1. In practice, it is observed that the slight variation of stroke of the vibrating tip before the impact, and the slight difference with respect to the vertical do not bring about any appreciable variations in the effects of the impact. The line conserves the necessary sharpness for making identification markings.

Furthermore, it should be noted that the two drives 11, 20 are step-by-step motors, controlled by pulses from electronic pulse-generator means (not shown) well known to the man skilled in the art. These two motors are mounted on a plate 25 fixed with respect to the carriage 1. The inertia of the carriage is therefore reduced to a minimum and its only connection with a source of energy is a supple pipe (not shown) for supply of a compressed gas such as air; the supple pipe is connected to the orifice 26 of the pneumatic tool.

The embodiment of the device according to the invention may form the subject matter of numerous variants or adaptations. In particular, the transmission means between the motors and the mechanisms that they control may undergo numerous modifications. In this way, the synchronous belt 8 may be replaced by a chain. Similarly, the transmission by connecting rod 22 and crank 21 of the moment of the second drive means 20 may be replaced by a direct drive of the shaft 4, the motor being placed at the shaft end with a suitable reduction ratio.

Figure 5:
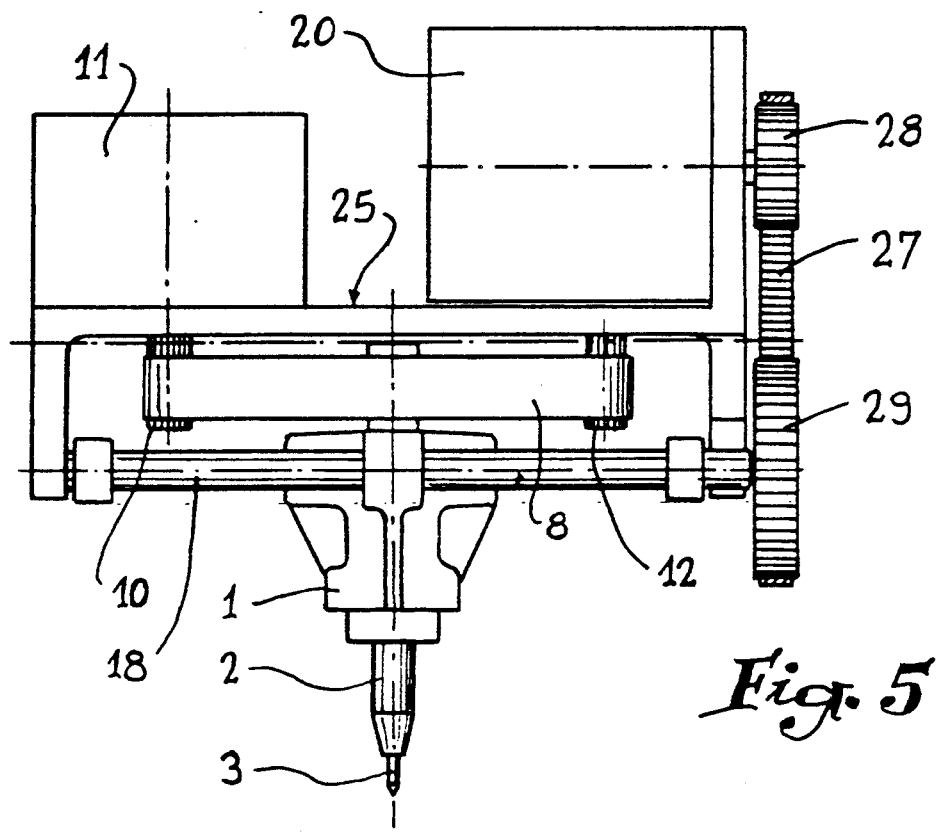
FIG. 5 is a view in elevation, similar to that of FIG. 2, but corresponding to a variant embodiment.

The variant embodiment illustrated in FIG. 5 may also be adopted where the connecting rod/crank system 21-22 is replaced by a belt 27 stretched between two pulleys of which one, 28, is fitted on the shaft of the motor 20 while the other, 29, is secured with the secondary shaft 18. Consequently, angular displacement of the tip or stylus 3 is obtained and, in addition, in order to facilitate replacement thereof, the assembly may be raised up to the position indicated at H in FIG. 1.

I claim:

1. A device for marking by micro-percussion the surface of an object utilizing a pneumatic tool having a vibrating tip comprising, a fixed plate means, a first shaft supported by said fixed plate means and having an elongated axis, a second shaft oriented generally parallel with respect to said first shaft, rod means connecting said second shaft to said first shaft, a carriage means slidably mounted on said first and second shafts, the pneumatic tool being carried by said carriage means, first drive means mounted to said fixed plate means for driving said carriage means along said first and second shafts so as to move the vibrating tip along a direction of translation generally coplanar with said elongated axis, second drive means carried by said fixed plate means, and means for connecting said second drive means for swinging said second shaft about said first shaft whereby said vibrating tip of the pneumatic tool is moved in an arc with respect to said elongated axis of said first shaft.

2. The marking device of claim 1 in which said elongated axis of said first shaft is spaced from the surface of an object to be marked at a distance which is at least 1.5 times the length of a line segment defined by said arc.

3. The marking device of claim 2 in which said distance is greater than twice the length of said line segment.

4. The marking device of claim 1 in which said first drive means includes a motor means having a drive output means, a continuous belt means drivingly engaged by said drive output means and means for connecting said carriage means to said continuous belt whereby said first motor means drives said continuous belt means to move said carriage means along said first and second shafts.

5. The marking device of claim 4 in which said second drive means includes a second motor means having an output crank, said means for connecting said second drive means for swinging said second shaft about said first shaft including a connecting rod extending from said crank means to said second shaft.

6. The marking device of claim 5 in which said carriage means includes a pair of spaced bearing surfaces, said first shaft extending through said spaced bearing surfaces of said carriage means and a cylindrical member mounted about said first shaft and intermediate said first and second bearing surfaces and said means for connecting said carriage means to said continuous belt means includes a connection rod means connecting said cylindrical member to said continuous belt means.

7. The marking device of claim 4 in which said second drive means includes a second motor having an output shaft, and said means for connecting said second drive means for swinging said second shaft about said first shaft includes a first pulley means attached to said output shaft of said second motor and a second pulley means attached to said second shaft and belt means for interconnecting said first and second pulley means.

* * * * *